(12) United States Patent
Sheward et al.

(10) Patent No.: US 12,705,266 B2
(45) Date of Patent: Aug. 11, 2026

(54) METHOD AND APPARATUS FOR AI-ASSISTED VIRTUAL ASSISTANT FOR SME AGENT

(71) Applicant: PwC Product Sales LLC, New York, NY (US)

(72) Inventors: Paul Sheward, Chicago, IL (US); Chung-Sheng Li, Scarsdale, NY (US); Scott Likens, Austin, TX (US); Saverio Fato, Wilton Manors, FL (US); Joseph Doyle Harrington, Granite Bay, CA (US); Joseph David Voyles, Louisville, KY (US); Jonathan B. Rhine, Suffern, NY (US); Alexander Nicholas Boldizsar, Woodstock, CT (US); Winnie Cheng, West New York, NJ (US); Todd Christopher Morrill, Newburgh, NY (US); Yuan Wan, Irvine, CA (US); William Spotswood Seward, Los Angeles, CA (US)

(73) Assignee: PwC Product Sales LLC, New York, NY (US)

( * ) Notice: Subject to any disclaimer, the term of this patent is extended or adjusted under 35 U.S.C. 154(b) by 173 days.

(21) Appl. No.: 18/353,449

(22) Filed: Jul. 17, 2023

(65) Prior Publication Data

US 2025/0028742 A1 Jan. 23, 2025

(51) Int. Cl.
*G06F 16/3329* (2025.01)

(52) U.S. Cl.
CPC ................................ *G06F 16/3329* (2019.01)

(58) Field of Classification Search
CPC .................................................. G06F 16/3329
See application file for complete search history.

(56) References Cited

U.S. PATENT DOCUMENTS 5,331,554 A * 7/1994 Graham ................ G06F 16/322
707/999.005
5,754,939 A * 5/1998 Herz ................. H04N 21/4622
348/E7.071

(Continued)

OTHER PUBLICATIONS

Al-Kofahi et al. (2001) "A machine learning approach to prior case retrieval," Proceedings of the 8th International Conference on Artificial Intelligence and Law; pp. 88-93.

(Continued)

*Primary Examiner* — Fariba Sirjani
(74) *Attorney, Agent, or Firm* — Morrison & Foerster LLP

(57) ABSTRACT

A method for providing a hybrid AI and human electronic communication interface includes receiving a first electronic transmission comprising a user query from a user device. The method further includes automatically generating, by processing the user query by a set of AI models, an automatic response to the user query. The method further includes electronically transmitting the automatic response to the user device. The method further includes receiving, from the user device, a second electronic transmission comprising a user input in response to the automatic response. The method further includes determining, based at least in part on processing the user input, that a set of criteria is met; and in accordance with the determination that the set of criteria are met, automatically instantiating an electronic communication connection between the user device and a second user device.

18 Claims, 5 Drawing Sheets

(56) References Cited

U.S. PATENT DOCUMENTS

| | | | | |
|---|---|---|---|---|
| 8,375,049 | B2 | 2/2013 | Bailey et al. | |
| 10,031,950 | B2 * | 7/2018 | Ullman | G06Q 30/0625 |
| 10,360,265 | B1 * | 7/2019 | Agarwal | G10L 15/1815 |
| 10,614,101 | B2 * | 4/2020 | Agarwal | G06F 16/243 |
| 12,282,501 | B2 * | 4/2025 | Sheward | G06F 16/3326 |
| 2003/0046277 | A1 | 3/2003 | Jackson et al. | |
| 2003/0144895 | A1 * | 7/2003 | Aksu | G09B 7/00 705/7.14 |
| 2005/0055341 | A1 * | 3/2005 | Haahr | G06F 16/285 |
| 2005/0118557 | A1 * | 6/2005 | Sumner, II | G09B 7/02 434/323 |
| 2007/0203894 | A1 | 8/2007 | Jones et al. | |
| 2010/0299342 | A1 * | 11/2010 | Gustafson | G06F 16/3338 706/50 |
| 2013/0036062 | A1 | 2/2013 | Natarajan et al. | |
| 2013/0132203 | A1 * | 5/2013 | Cheng | G06Q 30/0241 705/14.66 |
| 2015/0074096 | A1 * | 3/2015 | Roche | G06F 16/951 707/728 |
| 2015/0088733 | A1 * | 3/2015 | Monastyrsky | G06Q 20/382 705/39 |
| 2016/0110422 | A1 * | 4/2016 | Roytman | H04M 7/00 706/12 |
| 2017/0055895 | A1 * | 3/2017 | Des Jardins | G10L 17/26 |
| 2017/0193997 | A1 * | 7/2017 | Chen | G10L 15/26 |
| 2018/0054464 | A1 | 2/2018 | Zhang et al. | |
| 2018/0108025 | A1 * | 4/2018 | Agarwal | H04L 51/216 |
| 2018/0357286 | A1 | 12/2018 | Wang et al. | |
| 2019/0163805 | A1 * | 5/2019 | Agarwal | G06F 16/285 |
| 2019/0220695 | A1 | 7/2019 | Nefedov | |
| 2020/0034357 | A1 | 1/2020 | Panuganty et al. | |
| 2020/0202194 | A1 * | 6/2020 | Wu | G06F 40/35 |
| 2021/0014354 | A1 | 1/2021 | Ly et al. | |
| 2021/0042800 | A1 * | 2/2021 | Chandra | H04L 51/02 |
| 2021/0406735 | A1 * | 12/2021 | Nahamoo | G06F 16/24522 |
| 2022/0357177 | A1 | 11/2022 | Skupin | |
| 2023/0353516 | A1 * | 11/2023 | Banerjee | G06Q 20/108 |
| 2024/0168982 | A1 | 5/2024 | Patnaik et al. | |
| 2024/0338393 | A1 | 10/2024 | Malon et al. | |
| 2024/0378389 | A1 | 11/2024 | Rose et al. | |
| 2024/0419694 | A1 * | 12/2024 | Sheward | G06F 16/3326 |
| 2025/0028742 | A1 * | 1/2025 | Sheward | G06F 16/3329 |
| 2025/0231971 | A1 | 7/2025 | Sheward et al. | |

OTHER PUBLICATIONS

International Search Report and Written Opinion mailed Nov. 6, 2023, directed to International Application No. PCT/US2023/070333; 11 pages.

International Search Report and Written Opinion mailed Oct. 6, 2023, directed to International Application No. PCT/US2023/068607; 11 pages.

Lu, et al. (2012) "Bringing order to legal documents—an issue-based recommendation system via cluster association," in Proceedings of the International Conference on Knowledge Engineering and Ontology Development, vol. 2, SciTePress; pp. 76-88.

Westermann, et al. "Paragraph similarity scoring and fine-tuned BERT for legal information retrieval and entailment," New Frontiers in Artificial Intelligence: JSAI-isAI 2020 Workshops, Jurisin, Lenls 2020 Workshops, Virtual Event, Nov. 15-17, 2020; 17 pages.

Francesconi et al. "Legal Knowledge and Information Systems," JURIX 2022: The Thirty-fifth Annual Conference, Dec. 14-16, 2022, Saarbrücken, Germany; 324 pages.

Kassner et al. (Oct. 2023). "Language Models with Rationality," arXiv:2305.14250v2; 12 pages.

Lin et al. (May 2024). "Generating with Confidence: Uncertainty Quantification for Black-box Large Language Models," arXiv:2305.19187v3; 28 pages.

Rozen et al. (May 2021). "Answering Product-Questions by Utilizing Questions from Other Contextually Similar Products," arXiv:2105.08956v1; 12 pages.

Sheward et al., U.S. Office Action dated Jan. 21, 2026, directed to U.S. Appl. No. 19/172,308; 19 pages.

Tian et al. (Oct. 2023). "Just Ask for Calibration: Strategies for Eliciting Calibrated Confidence Scores from Language Models Fine-Tuned with Human Feedback," arXiv:2305.14975v2; 10 pages.

* cited by examiner

METHOD AND APPARATUS FOR AI-ASSISTED VIRTUAL ASSISTANT FOR SME AGENT

FIELD

The present invention is generally related to artificial-intelligence assisted consultation, and more specifically to a hybrid artificial-intelligence and human assisted consultation.

BACKGROUND

Queries or questions in various fields may often require consulting with human experts to identify a resolution. However, access to human experts may be limited. Automatic response generators can help generate responses to user queries to improve the efficiency of providing responses to queries while also alleviating some of the burden on human experts. However, the automatic response generators may not be able to respond to all user queries that are submitted to it, such as due to a lack of information about specific topics. Without a human in the loop, it may be difficult to detect when such cases arise, and may lead to increased inefficiencies in providing responses to user queries.

SUMMARY

The present disclosure introduces a hybrid artificial intelligence (AI) and human communication interface that allows responses to be automatically generated for various queries when possible, while also detecting when a user query may need input from human experts in order to adequately generate a response. The hybrid AI and human interface may include an AI-based consultant application that receives a query from a user device and automatically generates a response to the query. The automatic response may be transmitted back to the user device where it is analyzed by a user. In cases where the consultant application may not be able to generate an adequate response to the query, the consultant application may receive another input from the user in response to the automatic response. Upon processing the user input and determining that a set of criteria is met indicating a negative user sentiment, the consultant application may connect the user device with the device of a human expert to allow the human expert to provide a response to the user's query.

In various embodiments, a method for providing a hybrid AI and human electronic communication interface includes receiving a first electronic transmission comprising a user query from a user device. The method further includes automatically generating, by processing the user query by a set of AI models, an automatic response to the user query. The method further includes electronically transmitting the automatic response to the user device. The method further includes receiving, from the user device, a second electronic transmission comprising a user input in response to the automatic response. The method further includes determining, based at least in part on processing the user input, that a set of criteria is met; and in accordance with the determination that the set of criteria are met, automatically instantiating an electronic communication connection between the user device and a second user device.

Optionally, the user query is a first query, the user input comprises a second query, processing the user input comprises determining a similarity between the first query and the second query, and the set of criteria comprises the similarity between the first query and the second query satisfying a similarity threshold.

Optionally, determining the similarity between the first query and the second query includes generating a first text embedding for the first query and a second text embedding for the second query; and determining a similarity score between the first text embedding and the second text embedding.

Optionally, the user input comprises one or more additional queries, wherein processing the user input comprises determining a quantity of the one or more additional queries, and wherein the set of criteria comprises the quantity satisfying a threshold number of queries.

Optionally, processing the user input comprises performing sentiment analysis on a text of the user input to determine a sentiment of the user input, and wherein the set of criteria comprises the sentiment being a negative sentiment.

Optionally, performing the sentiment analysis comprises detecting one or more keywords in the text of the user input.

Optionally, the user input comprises visual facial data of a user of the user device, wherein processing the user input comprises processing the visual facial data by a second set of AI models, and wherein the set of criteria comprises a negative sentiment output by the second set of AI models.

Optionally, the user input comprises negative feedback on the automatic response to the user query, and wherein the set of criteria comprises receiving the negative feedback.

Optionally, the method further includes storing the user query and an expert response to the user query provided by the second user device in a data store, wherein the user query is associated with the expert response in the data store.

Optionally, the method further includes automatically generating an improved automatic response to a subsequent user query based on the expert response stored in the data store.

Optionally, automatically generating the automatic response includes determining that a similarity score between the user query and a stored query stored in a data store satisfies a similarity threshold, wherein the stored query is associated with a data structure comprising one or more supplemental queries of the stored query, and wherein the automatic response is generated based on information associated with the one or more supplemental queries.

Optionally, the method further includes receiving, from the second user device, subject matter information corresponding to an expert response provided to the user query by the second user device; and updating the data structure with the subject matter information.

Optionally, the method further includes automatically generating an improved automatic response to a subsequent user query based on the updated data structure with the subject matter information.

Optionally, the data structure is a decision tree, wherein each of the one or more supplemental queries is a branching criteria for the decision tree, and wherein the information associated with the one or more supplemental queries are leaf nodes of the decision tree.

Optionally, automatically generating the automatic response includes: determining that a set of similarity scores between the user query and each of a plurality of stored queries stored in a data store is below a similarity threshold; and generating one or more recommended queries to the user, wherein each of the one or more recommended queries is generated based on the user query.

Optionally, the second user device is selected from a set of user devices, wherein each user device of the set of user devices corresponds to one of a set of subject matter expert profiles, wherein the second user device is selected based on analyzing features in each of the set of subject matter expert profiles, wherein the features comprise at least one of: an engagement history, a success rate in generating responses to user queries, and education and experience credentials.

Optionally, the method further includes transmitting, to the user device, a set of subject matter expert profiles to the user device; and receiving, from the user device, a third electronic transmission comprising a selected subject matter expert profile, wherein the second user device corresponds to the selected subject matter expert profile.

Optionally, the method further includes automatically retrieving data on a user associated with the user device from a data store; and wherein automatically instantiating the electronic communication comprises transmitting, to the second user device, the data on the user.

In various embodiments, a system for providing a hybrid AI and human electronic communication interface includes one or more processors and a memory coupled to the one or more processors comprising instructions executable by the one or more processors, the processors operable when executing the instructions to receive a first electronic transmission comprising a user query from a user device. The processors are further operable when executing the instructions to automatically generate, by processing the user query by a set of AI models, an automatic response to the user query. The processors are further operable when executing the instructions to electronically transmit the automatic response to the user device. The processors are further operable when executing the instructions to receive, from the user device, a second electronic transmission comprising a user input in response to the automatic response. The processors are further operable when executing the instructions to determine, based at least in part on processing the user input, that a set of criteria is met; and in accordance with the determination that the set of criteria are met, automatically instantiate an electronic communication connection between the user device and a second user device.

In various embodiments, a non-transitory computer-readable storage medium stores instructions for providing a hybrid AI and human electronic communication interface, the instructions operable when executed by one or more processors of a system to cause the system to receive a first electronic transmission comprising a user query from a user device. The instructions are further operable when executed to cause the system to automatically generate, by processing the user query by a set of AI models, an automatic response to the user query. The instructions are further operable when executed to cause the system to electronically transmit the automatic response to the user device. The instructions are further operable when executed to cause the system to receive, from the user device, a second electronic transmission comprising a user input in response to the automatic response. The instructions are further operable when executed to cause the system to determine, based at least in part on processing the user input, that a set of criteria is met; and in accordance with the determination that the set of criteria are met, automatically instantiate an electronic communication connection between the user device and a second user device.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

The present disclosure introduces a hybrid artificial intelligence (AI) and human electronic communication interface that allows responses to be automatically generated for various queries when possible, while also detecting when a user query may need input from human experts in order to adequately generate a response. The hybrid AI and human interface may include an AI-based consultant application that receives a query from a user device and then automatically generates a response to the user query. The automatic response may be generated from operations using information associated with previously known user queries that are similar to the newly received user query, or the automatic response may be generated using a trained AI model that is capable of responding to various user queries.

The automatic response may be transmitted back to the user device where it is analyzed by a user. The automatic response may also be stored so it may be used in subsequent processing to improve the ability of the consultant application to automatically generate responses to future user queries. The user may determine that the automatic response is not an adequate response to the user query, in which case the consultant application may receive another input from the user in response to the automatic response. The consultant application may process the user input to determine if a set of criteria is met, where the set of criteria indicate when a user may be exhibiting a negative sentiment. The set of criteria being met may indicate that a human expert should be involved to provide a response to the user. The consultant application may then establish a connection between the user device and a second device associated with an expert to allow the expert to provide an expert response. The expert response may also be stored to improve the consultant application's ability to automatically generate responses for future user queries.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Figure 1:
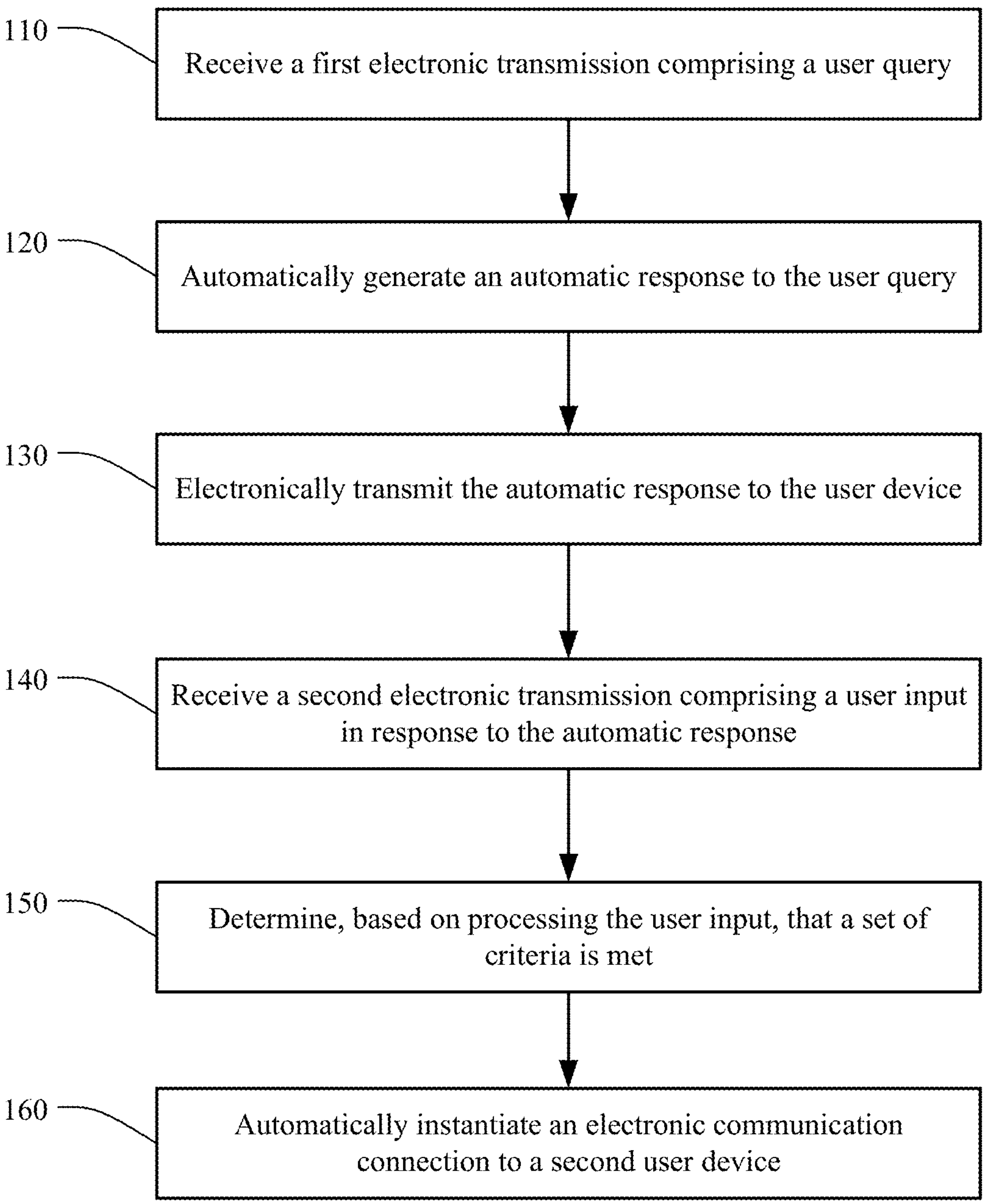
FIG. 1 illustrates a method for providing a hybrid AI and human electronic communication interface.

FIG. 1 illustrates a method 100 for providing a hybrid AI and human electronic communication interface. The method 100 may be executed by an application on any computing device, where the application may operate as an artificial-intelligence-based consultant for the user that automatically provides guidance on various questions that the user may have, and may also be referenced herein as the consultant application. The method 100 may include step 110 where the consultant application may receive a first electronic transmission that includes a query from a user device. The query received from the user device may also be referenced herein as the user query. The user query may include a question that the user has about a particular topic. In various embodiments, the user query may be associated with additional information that the consultant application may use to automatically generate a response to the user query, such as the current case that the user is working on. The additional information may be received as an additional electronic transmission from the user device, and may be received concurrently with or separately from the user query.

At step 120, the consultant application may automatically generate an automatic response to the user query, which may be generated in any appropriate manner. For example, the consultant application may execute a preconfigured sequence of operations to generate and provide a response to the user's query. The operations may include searching data stores for known queries that are similar to the user's query, parsing the query into constituent parts to process the parts separately, retrieving data that may be related to the user query based on processing the user query, or sending electronic transmissions to the user device requesting additional information from the user, among others. For example, the consultant application may determine similarity scores between the user query and one or more stored queries. The similarity scores may then be compared against a similarity threshold to determine if any stored queries are similar to the user query. In the case where a stored query is similar to the user query (e.g., the similarity score between that stored query and the user query satisfies the similarity threshold), the consultant application may generate the automatic response to the user query based on the stored query, such as by using the response that had been generated for that stored query or generating a response based on the case data associated with the stored query. In the case where no stored query is similar to the user query (e.g., all of the similarity scores between the stored queries and the user query is below the similarity threshold), the consultant application may generate one or more recommended queries based on the user query and provide the recommended queries as the response to the user query. The recommended queries, and any user input provided in response to the recommended queries, may allow the consultant application to generate an automatic response to the original user query.

Alternatively, the consultant application may include trained artificial intelligence (AI) models that analyze the substance of the user query to generate a response. The AI model may include various text generation or natural language processing techniques capable of processing the text in the user query. The AI model may also be trained using previous engagements with other user queries (e.g., previous user queries, responses to previous user queries, information used to generate the responses, case information associated with previous user queries etc.) such that the AI model is capable of understanding the substance of the user query and subsequently generating a response to the user query. In any case, the consultant application may be implemented such that the consultant application is able to generate a response to the user query without manual input from an administrator or another user. This way, the consultant application is able to automatically generate the response to the user query.

After the consultant application generates a response, at step 130, the consultant application may electronically transmit the automatic response back to the user device, where it may be accessed by the user that originally provided the user query. In various embodiments, the automatic response generated by the consultant application may also be stored in a data store so it may be accessed for various subsequent operations. For example, the automatic responses may be stored and then subsequently used to fine-tune or improve the AI model of the consultant application. This means the responses generated by earlier versions of the AI model of the consultant application may be used to train subsequent versions of the AI model. The automatic responses being stored may also allow administrators to analyze the consultant application's response trends, such as to identify topics that the consultant application is able to adequately generate responses for and topics that the consultant application is not as able to adequately generate responses for.

After the automatic response is transmitted back to the user device, the user that originally provided the user query may access the automatic response and evaluate the adequacy of the automatic response with respect to the user query. If the user determines that the automatic response adequately addressed the user query, the user may terminate the session with the consultant application, which may mean the electronic connection between the consultant application and the user device is terminated. If the user determines that the automatic response does not adequately address the user query, then at step 140, the consultant application may receive a second electronic transmission with a user input in response to the automatic response.

The user input included in the second electronic transmission may be various kinds of input depending on the user's analysis of the automatic response with respect to the original user query. For example, the user may determine that the automatic response did not address the user query, and as a result, the user may input the original user query again to try and get a better response. In this case, the user input in the second electronic transmission may be the same or similar to the user query in the first electronic transmission received at step 110. The consultant application may then generate and transmit another automatic response to the user device. Because the response is automatically generated, it may be the case that the subsequent responses are the same or similar as the initial response generated at step 120.

Although the example of the user input being the same or similar to the original user query is described, many other user inputs may be received at step 140, with additional examples described further below.

In various embodiments, the flow of execution in method 100 may return to step 120 after step 140. That is, the consultant application may receive a second electronic transmission with a user input at step 140 that is in response to the automatic response that was generated at step 120, and then return to step 120 to generate another automatic response to the user input. Using the example from above, the user input received at step 140 may include the user query originally received at step 110, in which case the flow of execution in method 100 may return to step 120 where the consultant application automatically generates another automatic response to the user query. This way, the consultant application may be able to receive multiple inputs from the user via the user device and also automatically generate multiple responses to those inputs before routing the user to a live agent (e.g., a subject matter expert) as described further below. The user inputs received at different instances of step 140 may also be different, which may mean the corresponding automatic responses that are generated at different instances of step 120 may also be different. For example, the consultant application may receive, at a first instance of step 140, a first user input that includes a user query that is syntactically the same or similar to the user query received at step 110, and then receive, at a second instance of step 140, a second user input that includes another user query that is syntactically different but semantically similar to the user query received at step 110. The consultant application may then generate two automatic responses at the two corresponding instances of step 120 in response to the two user inputs.

At step 150, the consultant application may determine, based on processing the user input received at step 140, that a set of criteria are met. The set of criteria may include various conditions that indicate when a live agent (such as a subject matter expert) may need to become involved to help generate a response to the user query in place of the automatic responses from the consultant application. The processing that is performed on the user input may also depend on what is included in the user input and the set of criteria. For example, the user input may include another user query, and processing the user input may include determining the similarity between the user query received at step 110 and the additional user query received as part of step 140. The similarity between the user queries may be a syntactic or semantic similarity between the user queries, and may be determined in any appropriate manner. For example, syntactic similarity may be determined based on the number of character differences between the user queries. Semantic similarity may be determined by generating text embeddings for each of the user queries and then determining a similarity score between the user queries' text embeddings. In various embodiments, the text embeddings may be contextual text embeddings that captures the context of the words in the user queries, which may help capture the meaning of the user queries and allow the similarity of the user queries to be determined based on their meanings. The similarity score may then be generated as a cosine similarity between the text embeddings. In this example, the set of criteria may include the similarity between the queries satisfying a similarity threshold, which may indicate that the user is continuously providing the same or similar queries without receiving a satisfactory response from the consultant application.

As another example, the user input received at step 140 may include an additional user query, and the processing that is performed on the user input may include maintaining a counter that tracks a total number of user queries that the consultant application has received in a single session, such as by incrementing the counter whenever a user input is received. The set of criteria may then include the count for the number of user queries received satisfying a threshold number of queries, which may indicate that the user has inputted a substantial number of queries to the consultant application without receiving a satisfactory response. In various embodiments, the counter may be incremented whenever any user query is received from the user device. In various other embodiments, the counter may only be incremented when receiving a user query that satisfies a predefined condition, such as a user query that is semantically different than the most recently received user query. Various embodiments may also implement a hybrid approach of the two examples described above, such as maintaining a first counter that tracks all user queries without consideration on whether a condition is satisfied, and also maintaining a second counter that only tracks the user queries that satisfy a condition. In this case, the set of criteria may include the first counter satisfying a first threshold number of queries and the second counter satisfying a second threshold number of queries, where only one of the criteria being met means that the set of criteria is met.

As another example, the user input received at step 140 may include a sequence of text. The text may be a user query, or the text may be textual feedback on the automatic response that was transmitted to the user device at step 130. The processing that is performed on the user input may include performing sentiment analysis on the text of the user input to determine a sentiment of the user, which may be implemented in any appropriate manner. For example, the consultant application may include an AI model that is trained to detect various classes of sentiment in a sequence of text. The AI model for performing sentiment analysis on the text of the user input may be different than the AI model that evaluates the original user query received at step 110 and generates the automatic response at step 120. The text in the user input may be provided to the trained AI model and the sentiment classification output may be used in determining whether the set of criteria is met. In this case, the set of criteria may include the output of the AI model indicating a sentiment that tends toward a negative sentiment. This may indicate that the user is exhibiting a negative sentiment toward the automatic responses generated by the consultant application. In various embodiments, the sentiment analysis may include detecting one or more keywords in the text. The keywords may be preselected as words that indicate a negative sentiment, and may include words that indicate use of strong language, vulgarity, or profanity, among others. The set of criteria may then include some number of keywords being detected in the text of the user input. In various embodiments, besides textual feedback, the user input may also include various other forms of feedback, such as a selection from a graphical user interface (GUI) element of the consultant application. The GUI element may include a plurality of predefined selections, where each selection may correspond with feedback of a specific sentiment for the automatic response. The user input may include a selection corresponding to negative feedback, and the set of criteria may include receiving any one of the predefined selections that correspond to feedback with a negative sentiment.

As another example, the user input received at step 140 may include visual facial data of the user of the user device.

The visual facial data may include images or videos of the user that were captured by an integrated camera of the user device. The processing performed on the user input may include providing the visual facial data to an AI model that is trained to detect the sentiment in visual data. The AI model for detecting sentiment from visual data may be integrated as part of the consultant application, but may be separate from the AI model used to analyze the query received at step 110 and generate an automatic response at step 120. The AI model may process the visual facial data and generate an output classifying the visual facial data into one of a plurality of sentiments. Processing the user input may also include various pre-processing and post-processing operations in addition to providing the visual facial data to the AI model. For example, the images and videos may be pre-processed to improve the resolution and clarity to help the AI model generate a more accurate output. Depending on how the AI model is structured, various sections of the image or video may be cropped out. The cropped out sections may then be provided to the AI model as it may be configured to analyze specific areas of a face. The output of the AI model may be processed to consider various additional factors, such as the temporal information in video or any contextual information associated with the visual facial data. In various embodiments, the pre-processing and post-processing operations may be performed by the same AI model that performs the sentiment analysis on the visual facial data, by one or more different AI models, or as a sequence of software operations by the consultant application. In this example, the set of criteria may include a negative sentiment output being generated by the AI model, as that may indicate the user is visibly developing a negative sentiment toward the automatic responses generated by the consultant application.

Although different AI models may be used to analyze the user query received at step 110 and to process the visual facial data received at step 140 as described above, in various embodiments, the user query and the visual facial data may be processed simultaneously This may mean that the visual facial data is received as part of the first electronic transmission at step 110. The consultant application may process the visual facial data to generate a current sentiment for the user that provided the user query. If a neutral or positive sentiment is detected, the consultant application may proceed sequentially through the steps of method 100. If a negative sentiment is detected, the consultant application may then skip from step 110 to step 150 of method 100 to determine that a set of criteria is met as a result of the detected negative sentiment.

In determining that a set of criteria is met, the consultant application may detect when a user of the user device is beginning to exhibit a negative sentiment, such as becoming frustrated, toward the automatic responses generated by the consultant application by determining that a set of criteria is met. Various examples are described above for what the set of criteria may include and how the consultant application may process the user input received at step 140 to determine if the set of criteria are met as part of step 150. In various embodiments, the set of criteria may include multiple individual criteria, such as multiple of the example criteria described above. At step 150, the consultant application may determine that the set of criteria is met if at least one of the criteria in the set is met, if at least a predefined proportion of the criteria in the set is met (e.g., if at least 40% of the criteria in the set is met), or only if all of the criteria in the set is met.

When checking whether each of the criteria in the set is met, the consultant application may check each criteria separately or all of the criteria simultaneously. When checking the criteria separately, the consultant application may check the criteria one at a time based on a predetermined order, such as based on a decreasing order of importance of the criteria. This may mean that the criteria with a higher importance are checked before the criteria with a lower importance. The importance of a criteria may be based on how clearly the criteria indicates that a user is exhibiting a negative sentiment. For example, the output of a sentiment analysis on the text of the user input may provide a better indication of the user's sentiment than a count of the number of user queries received from the user device. Thus, a criteria based on the output of the sentiment analysis may be checked prior to a criteria based on the number of user queries received. However, the order that the criteria is checked may be based on various other metrics in various other embodiments, and various embodiments may also check the criteria separately in a randomized order.

As described above, the flow of execution in method 100 may return to step 120 after step 140 as the consultant application may automatically generate additional automatic responses based on the user input received at step 140. In various embodiments, the flow of execution in method 100 may also instead return to step 120 after step 150. This may mean that the consultant application receives the second electronic transmission with the user input at step 140, and then determines whether a set of criteria is met from receiving the user input at step 150. If the set of criteria is met, that may indicate that the user is beginning to exhibit a negative sentiment toward the consultant application, and the flow of execution in method 100 may proceed to step 160. If the set of criteria is not met, that may indicate that the user is not yet exhibiting a negative sentiment toward the consultant application, in which case the flow of execution in method 100 may return to step 120 where the consultant application may generate another automatic response based on the user input from step 140. This way, the consultant application may continuously generate automatic responses to user inputs as long as the user is not exhibiting a negative sentiment (i.e., the set of criteria is not met), and will then proceed to step 160 when the user does begin to exhibit a negative sentiment (i.e., the set of criteria is met).

When the consultant application determines, based on processing the user input, that the set of criteria is met, that may indicate that the user is exhibiting a negative sentiment and may in turn indicate that a live agent should get involved to provide a response to the user query in place of the consultant application. Thus, after determining that the set of criteria is met at step 150, the method 100 may proceed to step 160 where the consultant application may automatically instantiate an electronic communication connection between the user device and a second user device. While the user device may be associated with a user that has a question about a particular topic and thus provided the user query, the second user device may be associated with an expert (e.g., a subject matter expert, or SME) that is capable of providing a response to the user query. As such, the present disclosure may reference the second user device as an expert device to indicate that the second user device is associated with an expert and to differentiate from the user device that provided the user query at step 110.

In various embodiments, the consultant application may instantiate the electronic communication connection with the expert device while maintaining the connection with the user device. After instantiating the electronic communication connection, the consultant application may remain connected to both the user device and the expert device to operate as a middleman to route data (such as messages) between the devices. In various embodiments, the consultant application may instantiate a communication connection directly between the user device and the expert device, in which case the consultant application may then terminate its connection with both devices and allow the devices to communicate directly with one another.

In various embodiments, the consultant application may randomly select the expert device from a set of available expert devices associated with various SMEs. In various other embodiments, the consultant application may systematically select the expert device based on analyzing one or more factors of the SMEs associated with the set of available expert devices. Each of the available expert devices may be associated with a SME profile representing a corresponding SME, where the profiles include various information about the corresponding SME. For example, each of the profiles may include an engagement history for the corresponding SME, which may include any information associated with the SME based on previous instances when the SME provided a response to a user query. The information may include data that can help determine if the SME is the appropriate expert to provide the response to the user query, and may include aspects of the previous queries that the SME provided a response for or the specific interactions the SME had with a user in previous engagements with a user, or various statistical information associated with the SME, such as how quickly the SME resolved previous user queries or how many total user queries the SME has resolved. The SME profile may also include data for the success rate of the SME, which may be the proportion of user queries the SME was able to resolve from the total number of user queries which the SME was engaged in. The SME profile may also include the education and experience credentials of the SME, which the consultant application may use to determine if the SME is appropriate for responding to the particular user query. In various embodiments, the consultant application may select the SME and corresponding expert device to instantiate a communication connection with using additional AI models that are trained to analyze the data in the SME profiles, where the AI models may be separate from the AI models used to generate the automatic response at step 120 or process the user input at step 140. The consultant application may also consider the user queries received from the user device at steps 110 and 140 when selecting the SME and corresponding expert device. For example, the consultant application may provide the queries to the AI models that analyze the data in the SME profiles to help determine which profiles include data most relevant to the subject matter in the queries received from the user.

The consultant application may also allow the user that provided the user query to determine the SME they would prefer to engage with to receive a response to the user query. The consultant application may send an electronic transmission to the user device that includes the set of SME profiles. The consultant application may then receive a response electronic transmission from the user device with one or more selected SME profiles that the user prefers to engage with. The consultant application may determine which of the SMEs corresponding to the selected SME profiles are available and instantiate the electronic communication connection with the corresponding expert device. The selected SME profiles received from the user device may also list the profiles in the user's order of preference for each of the SMEs. In this case, the consultant application may instantiate a connection with the expert device corresponding to the first available and highest ranked SME from the selected SME profiles.

In certain instances of step 160, it may be the case that there are no SMEs, and thus expert device, available when the consultant application is about to execute step 160 to instantiate an electronic communication connection between the user device and an expert device. This may be the case for various reasons, such as when more users begin exhibiting a negative sentiment than there are SMEs available. In such cases, the consultant application may prioritize instantiating a communication connection for the user devices associated with the users with a higher negative sentiment level. That is, in processing the user input received from the user device at step 140, the consultant application may associate a specific quantity, such as a numerical score, with the sentiment of the user. For example, the sentiment level may correspond to the similarity level between the original user query received at step 110 and an additional user query received at step 140, a numerical value associated with a feedback that is received as part of the user input received at step 140, or a numerical value corresponding to the sentiment detected from visual facial data of the user input received at step 140. The consultant application may then prioritize the user devices associated with users with a higher negative sentiment level, which may indicate the users that are experiencing a stronger negative sentiment, and prioritize instantiating communication connections between an expert device and those user devices compared to user devices associated with users with a lower negative sentiment level.

After instantiating the electronic communication connection between the user device and the corresponding expert device, the consultant application may also transmit data about the user associated with the user device to the expert device. The consultant application may automatically retrieve data about the user from various data stores. The data about the user may include workflow data that is captured as the user goes about their normal workflow, some of the user's non-confidential personal information, or the discussion history of the user in various discussion groups, among many others.

When instantiating the electronic communication connection, the consultant application may also transmit any data received from the user device for the particular session. This may include the user query received at step 110 as well as the user input received at step 140. As described above, the user input may include another user query in addition to the original user query received at step 110, and the flow of execution in method 100 may loop through step 140 one or more times, which means the consultant application may receive multiple user queries. Thus, as part of instantiating the communication connection, the consultant application may transmit all of the user queries to the expert device.

After the electronic communication connection is instantiated between the user device and the expert device, the SME associated with the expert device may provide an expert response to the user query. The consultant application may also receive the expert response, which may then be stored in a data store along with the user query. The user query and the expert response may be stored together in the data store, or otherwise associated with each other in the data store, to record that the particular expert response was provided to the user query. The user query and corresponding expert response being stored may allow the consultant application to use the expert response to improve the automatic responses that are automatically generated for similar user queries in the future. For example, if the consultant application determines a subsequent user query is similar to the user query, the consultant application may automatically generate a response based on the expert response that is stored with the user query. This way, the consultant application may leverage any previous expert response provided by a SME to a previous user query to automatically generate responses to subsequent user queries. In cases where the consultant application may include an AI model for automatically generating the responses, the expert response may be stored and subsequently used to fine-tune the AI model at a later time, which may also allow the consultant application be able to automatically generate responses to subsequent user queries.

In various embodiments, after the electronic communication connection is instantiated between the user device and the expert device, but before an expert response is provided to the user query, the consultant application may receive a transmission from the expert device indicating that the SME associated with the expert device is not able to adequately provide a response to the user query. This may be due to any reason, such as the user query being on the same general topic that the SME is an expert in, but the particular user query being related to a particular detail that the SME is not as familiar with. The consultant application may then terminate the electronic communication connection between the user device and that expert device and instantiate a new electronic communication connection between the user device and a new expert device. The new expert device may be selected in a similar manner as the original expert device, such by analyzing the SME profiles to identify another suitable SME, or selecting another SME from the list of selected SMEs provided by the user.

Figure 2:
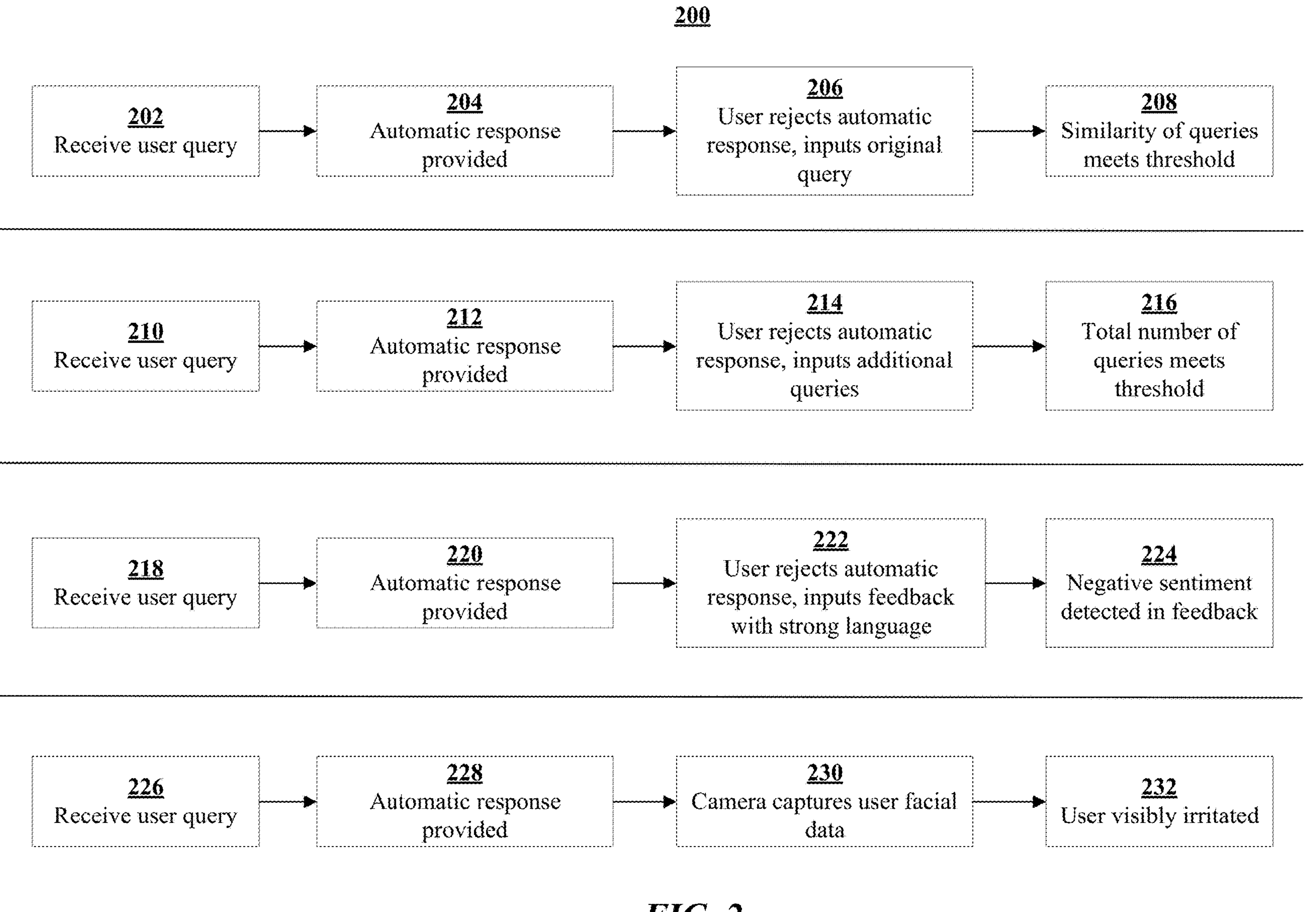
FIG. 2 illustrates a flow schematic of various sequences of exchanges between a consultant application and a user device.

FIG. 2 illustrates a flow schematic 200 of various sequences of exchanges between a consultant application and a user device. Each of the various sequences of exchanges may correspond to one or more steps of method 100 and may illustrate various examples of the consultant application automatically generating automatic responses for a user query and then detecting that the user begins to exhibit a negative sentiment. In one example sequence of exchanges, the consultant application may receive a user query from a user device at 202, which may correspond to step 110 of method 100. The consultant application may then generate an automatic response to the user query and transmit the automatic response back to the user device at 204, which may correspond to steps 120 and 130 of method 100. The user may reject the automatic response at 206 for various reasons and then provide a user input that includes the original user query to the consultant application, which may correspond to step 140 of method 100. The consultant application may process the user input and determine that the similarity of the user query received at 202 and the query received at 206 satisfies a similarity threshold at 208. As described above with respect to method 100, the similarity of the queries satisfying the similarity threshold may indicate the user is beginning to exhibit a negative sentiment. In various embodiments, 208 may correspond to step 150 of method 100. Consequently, the consultant application may then instantiate a communication connection between the user device and a second user device, or expert device, which may correspond to step 160 of method 100.

In another example sequence of exchanges, the consultant application may again receive a user query from a user device at 210, and then generate and transmit an automatic response to the user query back to the user device at 212. The user may again reject the automatic response at 214, but then provides a user input via the user device that includes additional user queries which may not be similar to the initial query provided at 210. The consultant application may process the user input which includes determining the number of user queries received from the user device. The consultant application may then determine that the number of user queries received satisfies a threshold at 216, which as also described above, may indicate the user is beginning to exhibit a negative sentiment. Consequently, the consultant application may again initiate a communication connection between the user device and an expert device to allow a SME to provide a response to the user query.

In a third example sequence of exchanges, the consultant application may again receive a user query from a user device at 218, and then generate and transmit an automatic response to the user query back to the user device at 220. The user may again reject the automatic response at 222, and then provide a user input that includes text feedback with strong language, such as vulgarity or profanity. The consultant application may perform a sentiment analysis on the text feedback in the user input as part of processing the user input, and may detect a negative sentiment in the feedback at 224 as the sentiment analysis generates an output that classifies the sentiment of the text feedback in the user input as a negative sentiment. Consequently, the consultant application may again initiate a communication connection between the user device and an expert device.

In a fourth example sequence of exchanges, the consultant application may again receive a user query from a user device at 226, and then generate and transmit an automatic response to the user query back to the user device at 228. The user may again reject the automatic response at 230, and the consultant application may receive a user input from the user device that includes the visual facial data of the user that was captured by a camera of the user device. The consultant application may process the user input and analyze the visual facial data, and may detect at 232 that the visual facial data indicates that the user is visibly irritated or exhibiting another similar negative sentiment. Consequently, the consultant application may again initiate a communication connection between the user device and an expert device.

Figure 3A:
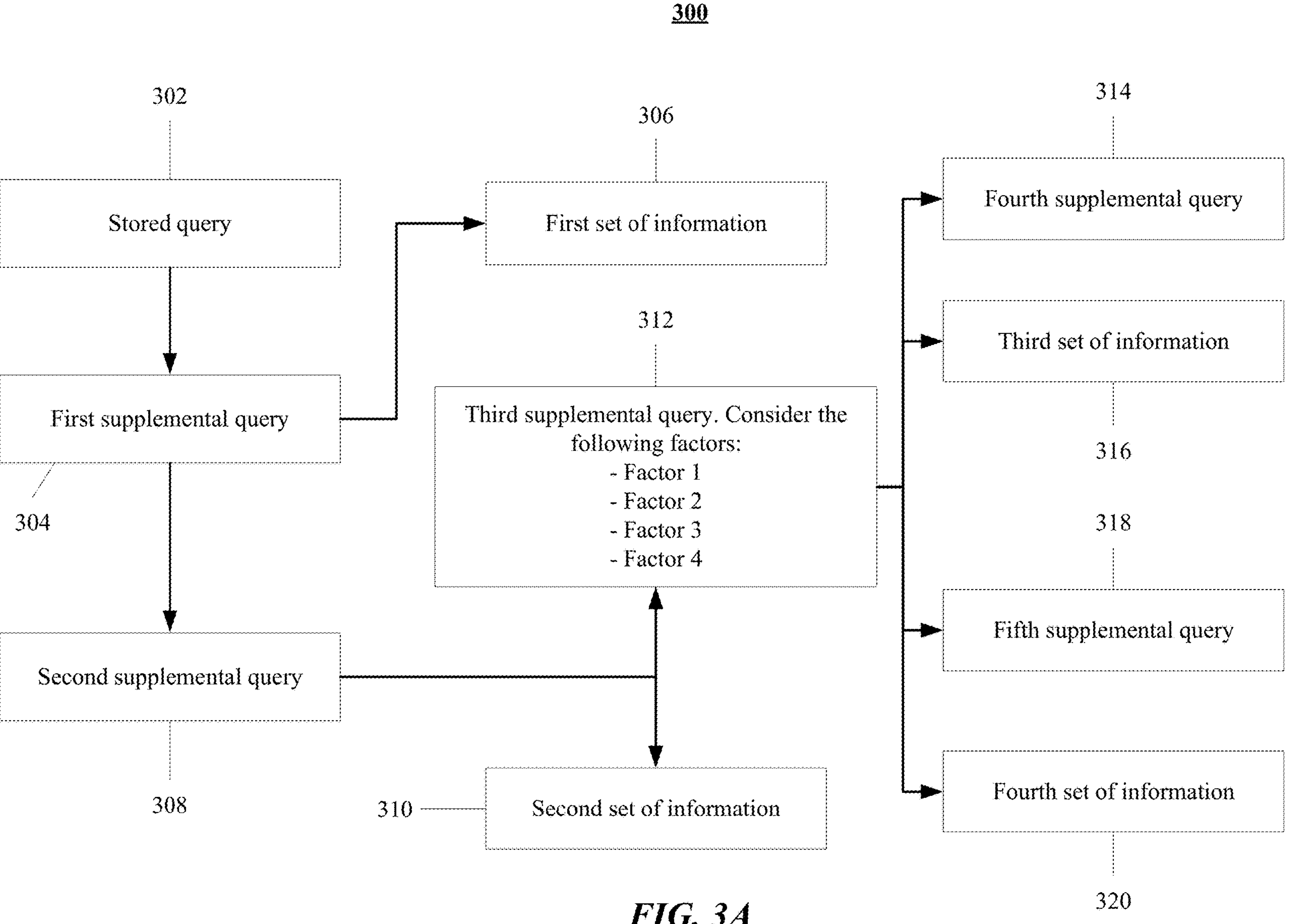
FIG. 3A illustrates an exemplary data structure that a consultant application may use when automatically generating responses to user queries.

FIG. 3A illustrates an exemplary data structure 300 that a consultant application may use when automatically generating responses to user queries. In various embodiments, the data structure 300 may also correspond to a flow schematic of the operations that the consultant application executes when automatically generating an automatic response to a user query. When the consultant application automatically generates an automatic response to a user query, one approach may include determining if the user query is similar to a known query stored in a data store, which may include previously received user queries or example queries provided by a SME. The similarity between the user query and a stored query may be determined in any appropriate manner, such as based on syntactic or semantic similarity. The consultant application may determine that the user query is similar to a stored query if the similarity between the user query and a stored query satisfies a similarity threshold. After a stored query that is similar to the user query is determined, the consultant application may access a data structure associated with the stored query to generate a response to the user query, where the data structure may include various information that can be used to generate the response.

In various embodiments, the data structure 300 may be an exemplary data structure associated with a stored query 302 that was determined to be similar to a user query received by the consultant application. The data structure 300 may include information that the consultant application may use to generate a response to a user query, and may also include various supplemental queries that may be provided to a user to obtain additional information related to the user query that may help the consultant application generate an automatic response. Specifically, when the consultant application accesses the data structure 300 corresponding to the stored query 302, the consultant application may first access a first supplemental query 304. The consultant application may provide the first supplemental query 304 to the user by transmitting an electronic transmission to the user device and receive a corresponding response from the user via the user device with additional information about the user query, such as the context of the user query. The consultant application may then determine that a first set of information 306 stored in the data structure 300 is adequate to generate an automatic response and may proceed accordingly. On the other hand, the consultant application may determine that additional information is needed to adequately generate an automatic response, in which case the consultant application may access a second supplemental query 308 of the data structure and transmit the second supplemental query to the user. This process may repeat until the consultant application determines that some set of information stored in the data structure 300 is adequate to generate an automatic response to the user query. As such, the consultant application may proceed through the data structure 300 to access one or more of the third supplemental query 312, the fourth supplemental query 314, and the fifth supplemental query 318, before generating an automatic response based on the second set of information 310, the third set of information 316, or the fourth set of information 320. In the exemplary data structure 300, the third supplemental query 312 may include one or more factors for the consultant application to consider to determine which subsequent supplemental query or set of information to access.

It may be noted that the exemplary data structure 300 may be implemented as a decision tree with various branches and leaf nodes. The supplemental queries of the data structure 300 may be the branching criteria of the decision tree that determines which subsequent branches of the decision tree will be accessed. For example, the first branching criteria may correspond to the first supplemental query 304, which may determine whether the first set of information 306 will be accessed or the second supplemental query 308. This may also mean that a data structure with more supplemental queries may result in a decision tree with more branches. On the other hand, the various sets of information stored in the data structure 300, such as the first 306 or second 310 set of information, may be the leaf nodes in the decision tree, where there are no subsequent branches that are accessible from those positions in the decision tree.

Figure 3B:
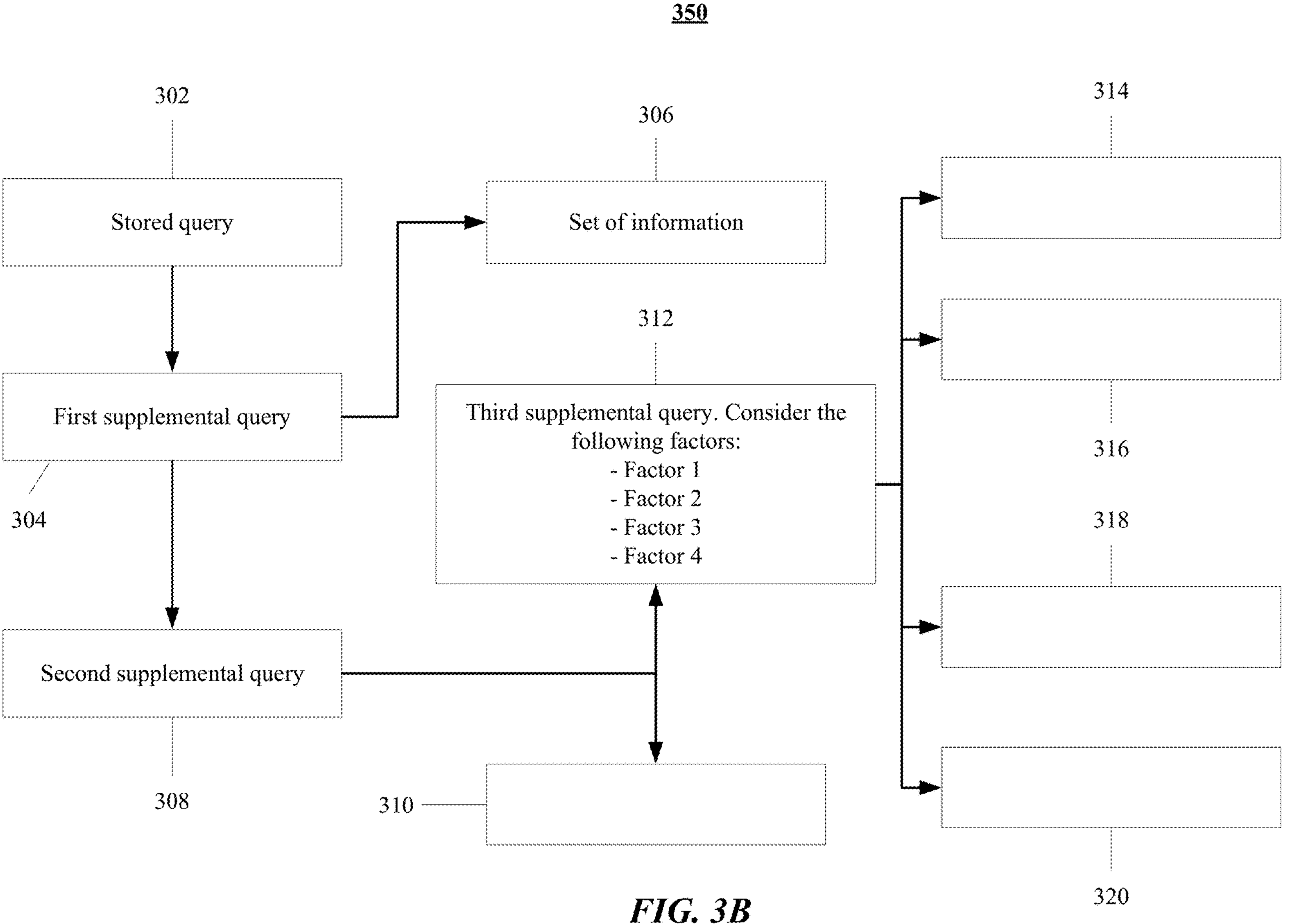
FIG. 3B illustrates an exemplary data structure that may be missing various data that the consultant application may use to generate an automatic response.

In various embodiments, the data structure 300 may be initially created by a SME or an administrator of the consultant application and then subsequently expanded as the consultant application is used by various users. However, this may mean that the data structure 300 does not have all the necessary information at a given time that would allow the consultant application to generate an automatic response for all user queries. FIG. 3B illustrates an exemplary data structure 350 that may be missing various data that the consultant application may use to generate an automatic response. In various embodiments, the data structure 350 may represent an earlier version of the data structure 300. As such, the consultant application may access the data structure 350 in a similar manner as that described above for accessing the data structure 300. That is, the consultant application may access the data structure 350 upon determining that the stored query 302 is similar to the user query. The consultant application may then access and transmit the first supplemental query 304 to the user, receive a corresponding response, and then either generate an automatic response using the stored set of information 306 or access the second supplemental query 308.

Upon accessing and transmitting the second supplemental query 308 to the user via the user device and receiving a corresponding response, the consultant application may determine that additional information is needed and proceed to access the third supplemental query 312. On the other hand, the consultant application may determine from the response to the second supplemental query 308 that a response can be generated for the user query. However, because the data structure 350 may not have the necessary information stored at 310, the consultant application may not be able to access the relevant information to generate an automatic response to the user query. The consultant application may realize that the information is missing when attempting to access the information at 310, and may consequently generate an automatic response to notify the user of the fact and proceed to initiate an electronic communication connection between the user device and an expert device, as described above with respect to step 160 of method 100. A similar process may occur after the third supplemental query 312 is accessed and transmitted to the user and a corresponding response is received.

The data structure 350 may be updated automatically or manually by a SME after the consultant application initiates a communication connection between the user device and an expert device and a SME of the expert device provides a response to the user query. For example, the consultant application may make a note of a location in the data structure 350 where the consultant application found missing information, such as the node 310. When an expert response to the user query is provided by the SME to the user as an electronic transmission from the expert device to the user device, the consultant application may also receive the expert response. The consultant application may then analyze the expert response to determine the subject matter information that the SME included in the expert response, and update the noted location in the data structure 350 with the subject matter information from the expert response. This way, if the consultant application found missing information at 310, the consultant application may update the data structure 350 to include the subject matter information from the expert response in the node at 310.

As part of receiving the expert response, the consultant application may receive the entire sequence of interactions between the SME and the user, including any additional questions that the SME may have posed to the user. The consultant application may then also analyze the sequence of interactions to determine the questions that led to the expert response. The consultant application may then also update the data structure 350 with new supplemental queries corresponding to the questions in addition to updating the data structure 350 with subject matter information. This way, the consultant application may also update nodes such as 314 and 318 in the data structure 350 to include additional supplemental queries. In various embodiments, the consultant application may analyze the expert response, including the sequence of interactions if appropriate, with any appropriate text analysis technique, such as trained AI models capable of natural language processing.

Alternatively, the data structure 350 may be updated manually by a SME as part of providing a response to a user query. When the consultant application initiates the communication connection between the user device and the expert device of the SME, the consultant application may transmit a notice to the SME that the communication connection was initialized due to missing information in the data structure 350. The SME may also be provided with the history of interactions between the user and the consultant application prior to the communication connection between the user device and expert device being initiated. After the SME provides an expert response to the user, the SME may manually update the data structure 350 with the subject matter information included in the expert response. The SME may also update the data structure with additional supplemental queries which may allow different sets of information to be accessed more accurately depending on the information provided to the supplemental queries. In both cases, whether the data structure 350 is updated automatically by the consultant application or manually by a SME after an expert response is provided to a user query, the data structure 350 may be gradually updated with additional information and supplemental queries to reach a state like that of the data structure 300.

Figure 4:
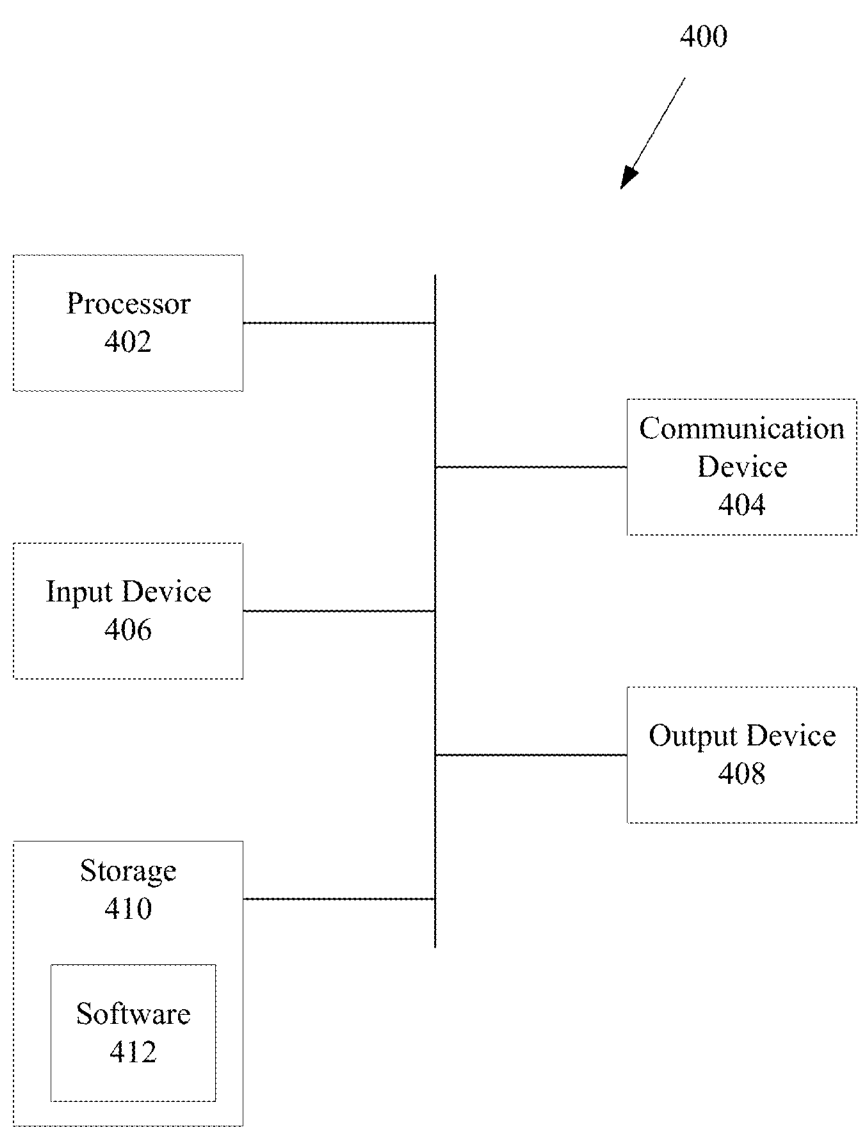
FIG. 4 illustrates an example of a computing system.

FIG. 4 illustrates an example of a computing system 400, in accordance with one or more examples of the disclosure. Computing system 400 can be a computer connected to a network. Computing system 400 can be a client computer or a server. As shown in FIG. 4, computing system 400 can be any suitable type of microprocessor-based device, such as a personal computer, workstation, server, or handheld computing device (portable electronic device) such as a phone or tablet, or dedicated device. The computing system can include, for example, one or more of processors 402, input device 406, output device 408, storage 410, and communication device 404. Input device 406 and output device 408 can generally correspond to those described above and can either be connectable or integrated with the computer.

Input device 406 can be any suitable device that provides input, such as a touch screen, keyboard or keypad, mouse, or voice-recognition device. Output device 408 can be any suitable device that provides output, such as a touch screen, haptics device, or speaker.

Storage 410 can be any suitable device that provides storage, such as an electrical, magnetic, or optical memory, including a RAM, cache, hard drive, removable storage disk, or other non-transitory computer readable medium. Communication device 404 can include any suitable device capable of transmitting and receiving signals over a network, such as a network interface chip or device. The components of the computing system can be connected in any suitable manner, such as via a physical bus or wirelessly.

Processor(s) 402 can be any suitable processor or combination of processors, including any of, or any combination of, a central processing unit (CPU), field programmable gate array (FPGA), and application-specific integrated circuit (ASIC). Software 412, which can be stored in storage 410 and executed by processor 402, can include, for example, the programming that embodies the functionality of the present disclosure (e.g., as embodied in the devices as described above).

Software 412 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 410, that can contain or store programming for use by or in connection with an instruction execution system, apparatus, or device.

Software 412 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computing system 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 400 can implement any operating system suitable for operating on the network. Software 412 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for providing a hybrid AI and human electronic communication interface, comprising:

receiving a first electronic transmission comprising a user query from a user device;

automatically generating, by processing the user query by a set of AI models, an automatic response to the user query;

electronically transmitting the automatic response to the user device;

receiving, from the user device, a second electronic transmission comprising a user input in response to the automatic response;

determining, based at least in part on processing the user input, that a set of criteria is met, wherein determining that the set of criteria is met comprises evaluating a plurality of criteria, wherein the plurality of criteria are evaluated based on a predetermined order, and determining that the set of criteria is met when at least a threshold number of the plurality of criteria are satisfied, wherein processing the user input comprises performing sentiment analysis on a text of the user input to determine a sentiment of the user input, and wherein the set of criteria comprises the sentiment being a negative sentiment; and in accordance with the determination that the set of criteria are met, automatically instantiating an electronic communication connection between the user device and a second user device.

2. The method of claim 1, wherein the user query is a first query, wherein the user input comprises a second query, wherein processing the user input comprises determining a similarity between the first query and the second query, and wherein determining the similarity between the first query and the second query comprises:

generating a first text embedding for the first query and a second text embedding for the second query; and determining a similarity score between the first text embedding and the second text embedding.

3. The method of claim 1, wherein the user input comprises one or more additional queries, wherein processing the user input comprises determining a quantity of the one or more additional queries, and wherein the set of criteria comprises the quantity satisfying a threshold number of queries.

4. The method of claim 1, wherein performing the sentiment analysis comprises detecting one or more keywords in the text of the user input.

5. The method of claim 1, wherein the user input comprises visual facial data of a user of the user device, wherein processing the user input comprises processing the visual facial data by a second set of AI models, and wherein the set of criteria comprises a negative sentiment output by the second set of AI models.

6. The method of claim 1, wherein the user input comprises negative feedback on the automatic response to the user query, and wherein the set of criteria comprises receiving the negative feedback.

7. The method of claim 1, further comprising storing the user query and an expert response to the user query provided by the second user device in a data store, wherein the user query is associated with the expert response in the data store.

8. The method of claim 7, further comprising automatically generating an improved automatic response to a subsequent user query based on the expert response stored in the data store.

9. The method of claim 1, wherein automatically generating the automatic response comprises determining that a similarity score between the user query and a stored query stored in a data store satisfies a similarity threshold, wherein the stored query is associated with a data structure comprising one or more supplemental queries of the stored query, and wherein the automatic response is generated based on information associated with the one or more supplemental queries.

10. The method of claim 9, further comprising:

receiving, from the second user device, subject matter information corresponding to an expert response provided to the user query by the second user device; and updating the data structure with the subject matter information.

11. The method of claim 10, further comprising automatically generating an improved automatic response to a subsequent user query based on the updated data structure with the subject matter information.

12. The method of claim 9, wherein the data structure is a decision tree, wherein each of the one or more supplemental queries is a branching criteria for the decision tree, and wherein the information associated with the one or more supplemental queries are leaf nodes of the decision tree.

13. The method of claim 1, wherein automatically generating the automatic response comprises:

determining that a set of similarity scores between the user query and each of a plurality of stored queries stored in a data store is below a similarity threshold; and generating one or more recommended queries to the user, wherein each of the one or more recommended queries is generated based on the user query.

14. The method of claim 1, wherein the second user device is selected from a set of user devices, wherein each user device of the set of user devices corresponds to one of a set of subject matter expert profiles, wherein the second user device is selected based on analyzing features in each of the set of subject matter expert profiles, wherein the features comprise at least one of:

an engagement history,
a success rate in generating responses to user queries, and
education and experience credentials.

15. The method of claim 1, further comprising:
transmitting, to the user device, a set of subject matter expert profiles to the user device; and
receiving, from the user device, a third electronic transmission comprising a selected subject matter expert profile, wherein the second user device corresponds to the selected subject matter expert profile.

16. The method of claim 1, further comprising:
automatically retrieving data on a user associated with the user device from a data store; and
wherein automatically instantiating the electronic communication comprises transmitting, to the second user device, the data on the user.

17. A system for providing a hybrid AI and human electronic communication interface, the system comprising:
one or more processors; and
a memory coupled to the one or more processors comprising instructions executable by the one or more processors, the processors operable when executing the instructions to:
receive a first electronic transmission comprising a user query from a user device;
automatically generate, by processing the user query by a set of AI models, an automatic response to the user query;
electronically transmit the automatic response to the user device;
receive, from the user device, a second electronic transmission comprising a user input in response to the automatic response;
determine, based at least in part on processing the user input, that a set of criteria is met, wherein determining that the set of criteria is met comprises evaluating a plurality of criteria, wherein the plurality of criteria are evaluated based on a predetermined order, and determining that the set of criteria is met when at least a threshold number of the plurality of criteria are satisfied, and
wherein processing the user input comprises performing sentiment analysis on a text of the user input to determine a sentiment of the user input, and
wherein the set of criteria comprises the sentiment being a negative sentiment; and
in accordance with the determination that the set of criteria are met, automatically instantiate an electronic communication connection between the user device and a second user device.

18. A non-transitory computer-readable storage medium storing instructions for providing a hybrid AI and human electronic communication interface, the instructions operable when executed by one or more processors of a system to cause the system to:
receive a first electronic transmission comprising a user query from a user device;
automatically generate, by processing the user query by a set of AI models, an automatic response to the user query;
electronically transmit the automatic response to the user device;
receive, from the user device, a second electronic transmission comprising a user input in response to the automatic response;
determine, based at least in part on processing the user input, that a set of criteria is met, wherein determining that the set of criteria is met comprises evaluating a plurality of criteria, wherein the plurality of criteria are evaluated based on a predetermined order, and determining that the set of criteria is met when at least a threshold number of the plurality of criteria are satisfied, and
wherein processing the user input comprises performing sentiment analysis on a text of the user input to determine a sentiment of the user input, and
wherein the set of criteria comprises the sentiment being a negative sentiment; and
in accordance with the determination that the set of criteria are met, automatically instantiate an electronic communication connection between the user device and a second user device.

* * * * *